United States Patent Office 3,299,164
Patented Jan. 17, 1967

3,299,164
TWO-STAGE POLYMERIZATION PROCESS
William Cyril Webber, Westhumble, near Dorking, and James Keith Hambling, Sunbury-on-Thames, England, assignors to The British Petroleum Company Limited, London, England, a British joint-stock corporation
No Drawing. Filed May 8, 1963, Ser. No. 279,005
Claims priority, application Great Britain, May 11, 1962, 18,194/62, 18,195/62, 18,196/62
6 Claims. (Cl. 260—683.15)

This invention relates to a process for the production of copolymers and to novel copolymers produced thereby.

According to the invention there is provided a process which comprises, in a first stage, polymerising a methylpentene in the presence of a catalyst under conditions such that at least part of the polymer produced is an olefinic hydrocarbon having a carbon number in the range 12–18 and, in a second stage, copolymerising this olefinic hydrocarbon with a different olefinically unsaturated compound, hereinafter referred to as a co-monomer.

The co-monomer may be mixed with the $C_{12}$–$C_{18}$ olefinic hydrocarbon subsequent to the formation of the latter.

According to a modification of the invention the co-monomer may be present in the reaction mixture of the first stage, the conditions of the first stage being such that the co-monomer does not react therein, thereafter changing the conditions and/or catalyst composition in the second stage whereby the co-monomer is copolymerised with at least part of the polymer produced in the first stage.

According to another modification of the invention the co-monomer is present in the reaction mixture of the first stage as unchanged methylpentene, the conditions of the first stage being such that a proportion of the methylpentene does not react, thereafter changing the conditions and/or the catalyst composition in the second stage whereby unchanged methylpentene is copolymerised with at least part of the polymer produced in the first stage.

Suitably the polymerisation of the methylpentene is carried out in the presence of a Ziegler type low molecular weight (LMW) catalyst. Suitable Ziegler LMW catalysts are the hydrides of beryllium, aluminium, gallium and indium and derivatives of such hydrides in which one or more of the hydrogen atoms are substituted by hydrocarbon radicals selected from the group consisting of alkyl radicals and aromatic radicals. A preferred class of catalyst is formed by the aluminium trialkyls.

Preferably when using a Ziegler type LMW catalyst the reaction pressure is super-atmospheric; preferably the reaction temperature lies in the range 80° to 350° C.

When using a Ziegler type LMW catalyst the preferred feedstock is 4-methylpentene-1.

Other catalysts which may be used for the polymerisation of the methylpentene are acid type catalysts, for example boron fluoride and complexes thereof, aluminium chloride, phosphoric acid and hydrogen fluoride; and free radical catalysts, for example peroxygen catalysts and azo compounds. The term "peroxygen catalyst" is used herein with reference to catalysts which are (a) formed by the action of hydrogen peroxide on acids or (b) liberate hydrogen peroxide on treatment with dilute sulphuric acid. Suitable peroxygen catalysts include diethyl peroxide, lauroyl peroxide, benzoyl peroxide, dialkyl peroxycarbonates, alkali metal persulphates, alkaline earth metal persulphates and ammonium persulphate. A typical azo-catalyst is azo-bisisobutyronitrile (AZBN).

Another class of catalysts which can be employed consists of the halides, other than fluorides, of a metal of Group IVa, Va, or VIa of the Periodic Table, for example titanium tetrachloride or zirconium tetrachloride. This class is hereinafter referred to as titanium tetrachloride type catalysts.

When using a catalyst other than a Ziegler-type LMW catalyst the preferred methylpentenes are 4-MP-1, 4-MP-2 and 2-MP-2.

Suitable co-monomers for use in the process of the invention include ethylene, propylene, normal butenes and isobutenes and 4-MP-1.

Copolymerisation may be carried out in the presence of the methylpentene polymerisation catalyst (in such cases as this catalyst is effective for the copolymerisation) if necessary changing the reaction conditions; otherwise further catalyst components or a new catalyst is added. If necessary the $C_{12}$–$C_{18}$ olefinic hydrocarbon will first be freed of the methylpentene polymerisation catalyst.

When a Ziegler-type LMW catalyst is used as the methylpentene polymerisation catalyst, there may be added to the $C_{12}$–$C_{18}$ product, containing this catalyst, a halide, other than a fluoride, of a metal of Group IVa, Va or VIa of the Periodic Table according to Mendeléef, for example titanium tetrachloride or zirconium tetrachloride. When a titanium tetrachloride type catalyst is used as the methylpentene polymerisation catalyst, there may be added, to the $C_{12}$–$C_{18}$ product, containing this catalyst, a Ziegler-type LMW catalyst.

In either of these two cases a Ziegler-type high molecular weight catalyst is constituted, for use in the copolymerisation.

If desired the copolymerisation may be carried out at high pressure in the presence of oxygen as catalyst.

In general when using an acid-type catalyst or oxygen as catalyst, any olefinic hydrocarbon may be used as co-monomer, for example, those hereinbefore stated to be suitable for use with a Ziegler type high molecular weight catalyst.

If desired the copolymerisation may be carried out by emulsion polymerisation technique using, for example, ammonium persulphate as catalyst.

Suitable co-monomers using emulsion polymerisation technique include vinyl acetate, vinyl chloride, vinyl ethyl ether and allyl chloride.

The invention is illustrated by but not limited with reference to the following examples.

*Example 1*

A dimer of 4-methylpentene-1 was prepared by contacting monomeric 4-methylpentene-1 with an aluminium tri-hexyl catalyst prepared by treating an excess of aluminium tri-isobutyl with 4-methylpentene-1 at 120° C.

Dimerisation was effected in bulk at a temperature of 150° C., and a pressure of 1500 p.s.i.g. under a nitrogen blanket.

7.5 ml. of the resulting dimer, 67.5 ml. isobutene and 150 ml. ethyl chloride were mixed and cooled to −90° C. A 0.5% solution of aluminium chloride in ethyl chloride was cooled at −78° C. 60 ml. of this catalyst solution was then added to the mixture with stirring over 12 minutes.

After 15 minutes from the commencement of the addition of catalyst solution, polymerisation was terminated by quenching the reaction mixture with methanol.

The polymer was recovered by precipitating it with acetone. 47 gm. of a mobile liquid copolymer was obtained.

The molecular weight of the copolymer, as determined ebullioscopically, was found to be 1200.

*Example 2*

A dimer of 4-methylpentene-1 was prepared as described with reference to Example 1.

37.5 ml. of the dimer, 37.5 ml. isobutene and 150 ml. ethyl chloride were mixed and cooled to −90° C. A 0.5% solution of aluminium chloride in ethyl chloride was cooled to −78° C. 100 ml. of this catalyst solution was then added to the mixture with stirring over 9 minutes.

After 60 minutes from the commencement of the addition of catalyst solution polymerisation was terminated by quenching the reaction mixture with methanol.

The polymer was recovered by precipitating it with acetone. 48 gm. of a viscous liquid copolymer was obtained.

The molecular weight of the copolymer, as determined ebullioscopically, was found to be 646.

*Example 3*

A dimer of 4-methylpentene-1 was prepared as described with reference to Example 1.

7.5 ml. of the dimer, 67.5 ml. of 4-methylpentene-1 and 150 ml. ethyl chloride were mixed and cooled to −90° C. A 1% solution of aluminium chloride in ethyl chloride was cooled to −78° C. 50 ml. of this catalyst solution was then added to the mixture with stirring over 1½ minutes.

After 16½ minutes from the commencement of the addition of the catalyst solution, polymerisation was terminated by quenching the reaction mixture with methanol.

The copolymer was recovered by precipitating it with acetone.

49 gm. of an extremely viscous liquid copolymer was obtained. Its molecular weight, as determined ebullioscopically, was found to be 5400.

*Example 4*

A dimer of 4-methylpentene-1 was prepared as described with reference to Example 1.

37.5 ml. of the dimer, 37.5 ml. of 4-methylpentene-1 and 150 ml. ethyl chloride were mixed and cooled to −90° C. A 1% solution of aluminium chloride in ethyl chloride was cooled to −78° C. 100 ml. of this catalyst solution was then added to the mixture with stirring over 12 minutes.

After 60 minutes from the commencement of the addition of the catalyst solution, polymerisation was terminated by quenching the reaction mixture with methanol.

The copolymer was recovered by precipitating it with acetone.

48 gm. of an extremely viscous liquid copolymer was obtained. Its molecular weight, as determined ebullioscopically, was found to be 860.

We claim:

1. A two-stage polymerization process which comprises contacting a methyl pentene monomer in a first stage with an aluminum alkyl catalyst at temperatures above 80° C. to form a first polymeric product comprising the dimer and trimer of the starting monomer and thereafter reacting the first polymeric product in a second stage with an olefin selected from the group consisting of methyl pentenes, butenes, propylene and ethylene in contact with an aluminum chloride catalyst and thereafter recovering a second polymeric product.

2. A process as in claim 1 wherein the first polymeric olefin product consists essentially of the dimer of the starting methyl pentene monomer.

3. A process as in claim 2 wherein the olefin in the second stage is other than the initial methyl pentene monomer.

4. A process as in claim 1 wherein the olefin in the second stage is other than the initial methyl pentene monomer.

5. A process as in claim 1 wherein the methyl pentene monomer is 4-methylpentene-1, the reaction pressure during formation of the polymeric olefin product is superatmospheric and the reaction temperature is within the range from 80° C. to 350° C.

6. A process as in claim 1 wherein the methyl pentene monomer is selected from group consisting of 4-methylpentene-1, 4-methylpentene-2 and 2-methylpentene-2.

References Cited by the Examiner

UNITED STATES PATENTS

| | | | |
|---|---|---|---|
| 2,568,209 | 9/1951 | Wackher et al. | 260—683.15 |
| 2,868,771 | 1/1959 | Ray et al. | 260—683.15 |
| 2,993,941 | 7/1961 | Warner | 260—683.15 |
| 3,092,675 | 6/1963 | Small | 260—683.15 |
| 3,109,869 | 11/1963 | Chambers et al. | 260—683.15 |
| 3,137,739 | 6/1964 | Paulis et al. | 260—683.15 |
| 3,189,589 | 6/1965 | Witt | 260—683.15 |

FOREIGN PATENTS 1,274,529   9/1961   France.

DELBERT E. GANTZ, *Primary Examiner.*

PAUL M. COUGHLAN, *Examiner.*

R. H. SHUBERT, *Assistant Examiner.*